May 15, 1945.　　　F. M. STARR　　　2,376,201
PROTECTIVE ARRANGEMENT
Filed May 30, 1942
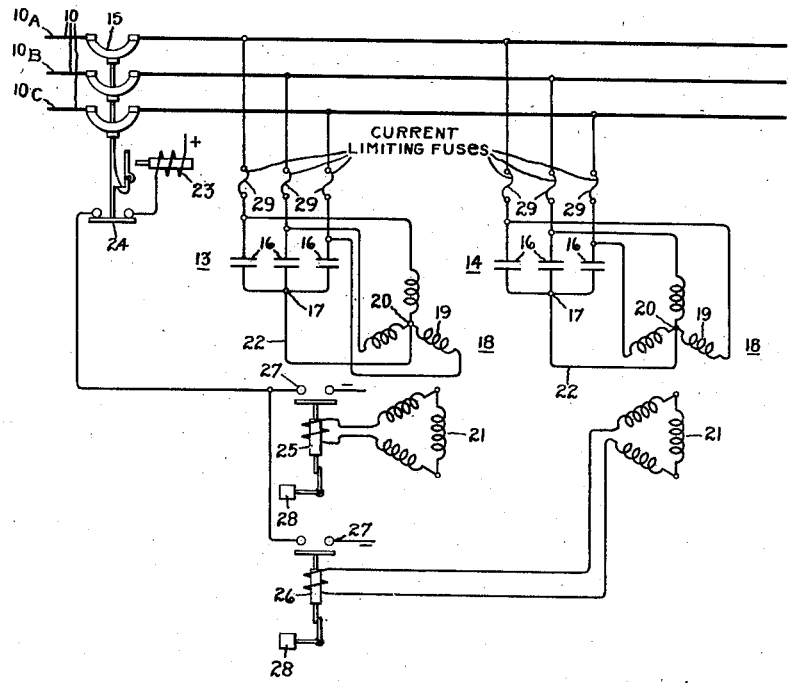
Inventor:
Frank M. Starr,
by Harry E. Dunham
His Attorney.

Patented May 15, 1945

2,376,201

UNITED STATES PATENT OFFICE 2,376,201

PROTECTIVE ARRANGEMENT

Frank M. Starr, Schenectady, N. Y., assignor to General Electric Company, a corporation of New York Application May 30, 1942, Serial No. 445,140

7 Claims. (Cl. 175—294)

My invention relates to a protective arrangement for an electric circuit or an electrical device and more particularly to a protective arrangement for star-connected capacitor banks associated with an electric circuit.

In order to correct the power factor of electric systems, it is often desirable to supply capacitive kva. to counteract the predominance of inductive load on the system causing relatively low power factor. Such power factor correction may be accomplished by banks of static type capacitors which, for a three-phase system, might be either star or mesh connected. With the mesh or delta connection, the capacitor units would require a higher voltage rating and, accordingly, would have a higher cost and would represent a more difficult manufacturing problem. Therefore, it would be desirable, if possible, to connect such capacitor banks in star or Y relationship. Heretofore, when a Y or star-connected capacitor bank has been used, it has been deemed essential to ground the neutral or to interconnect the neutral of the capacitor bank to the system neutral in order to insure adequate current to operate circuit interrupting devices in the event of individual unit failures. Such grounding or tying in of the neutral of the capacitor bank is objectionable, however, because it invariably accentuates telephone interference and introduces other difficulties with regard to the harmonic currents which flow. Heretofore, therefore, the mesh or delta connection was frequently used in spite of its higher cost and other objectionable features wherever interference with adjacent communication lines was a problem or where the system neutral was not available. It would be desirable, therefore, to provide a protective arrangement for capacitor banks which would give full protection under all conditions and yet which would permit the capacitor banks to be connected in star with an isolated neutral, thereby eliminating difficulties with regard to telephone interference.

As will be explained in more detail hereinafter, Y-connected capacitor banks provide a peculiar problem in regard to protection against faults thereon when the neutral thereof is isolated in that two very different levels of fault current are involved. In the event of the failure of a capacitor in one phase of the star-connected bank, a relatively low fault current proportional to the neutral voltage displacement will flow and it is a rather difficult matter if not impossible to discriminate between this low fault current and normal currents by the use of circuit-interrupting devices such as fuses or the like. On the other hand, a substantially simultaneous failure of capacitor units in two or more phases of the star-connected bank will cause a dead short circuit between line conductors of the system and very high fault currents will flow which, if not interrupted within a fraction of a cycle, will cause not only complete destruction of the faulty capacitor unit, as by blowing up or the like, but, since these capacitor units are usually stacked close together, may cause damage to many adjacent units.

Accordingly, it is an object of my invention to provide a new and improved protective arrangement for an electric device.

It is another object of my invention to provide a protective arrangement for a star-connected capacitor bank having an isolated neutral which is always maintained in the isolated condition.

Still another object of my invention is to provide a new and improved protective arrangement for a star-connected electric device having an isolated neutral which is subject to relatively low fault currents on failure of one phase of the device but subject to very high fault currents on substantially simultaneously failure of two or more phases of the device.

Further objects and advantages of my invention will become apparent as the following description proceeds and the features of novelty which characterize my invention will be pointed out with particularity in the claims annexed to and forming a part of this specification.

For a better understanding of my invention, reference may be had to the accompanying drawing in which the single figure thereof is a schematic diagram of a protective arrangement embodying my invention.

Referring now to the drawing, I have illustrated a polyphase electric system 10 which has been schematically illustrated as a three-phase system embodying phase conductors 10A, 10B, 10C, respectively. In order to improve the power factor of electric system 10, I provide a plurality of capacitor banks generally indicated at 13 and 14 which may be connected to system 10 through an electric circuit-interrupting device generally indicated at 15. For reasons set forth above, the capacitor banks 13 and 14 are illustrated as star-connected banks with the neutrals thereof isolated both from ground and the system neutral. Although I have disclosed two capacitor banks 13 and 14, it should be understood that one or more than two capacitor banks might be utilized which are controlled by a single circuit-interrupting device such as 15. If a plurality of banks, such as 13 and 14, are provided, an important advantage accrues with regard to restoring within a short period of time a large proportion of the capacitive kva. for power factor correction purposes upon the occurrence of a fault in one unit while, at the same time, reducing the cost by eliminating the requirement of a separate circuit-interrupting device, such as 15, for each capacitor bank.

Each of the star-connected capacitor banks 13 and 14 is illustrated as comprising a plurality of capacitors 16. It should be understood that, although a single capacitor is schematically illustrated for each phase of the polyphase circuit, in order to provide the desired capacitive kva., a large number of capacitor units would be connected in parallel in each phase to make up the desired capacitive kva. for each phase of the system.

It is a well-known fact that the in-rush current of capacitor banks when connected to the system requires protective fuses to have a rating of at least 1.65 times the normal current rating of the capacitors and, since fuses require about twice rated current to cause rupture of the fusible element, fuse operation would not occur unless the fault currents in the capacitor bank reached about 3.3 times normal current. If a capacitor is connected in Y or star and its neutral isolated, the failure of an individual unit in one phase of the bank will cause a collapse of the voltage across that phase and the fault current will be the result of the line voltage across the other two phases which for a three-phase system would be three times normal line current. It will be obvious then that it is practically impossible to protect a Y-connected capacitor bank having an isolated neutral against failure of a unit in a single phase thereof by standard fuses since the fault current will be only three times normal current and, as has been shown above, standard fuses require a current having a value equal to more than three times normal current to operate if they are designed so as not to operate on capacitor in-rush currents. Even if the capacitor bank could be protected by fuses which would operate below three times normal line current, it would be unsatisfactory protection since the time required for operation of the fuses with such low current would be too long to prevent rupture of the capacitor case. As has been pointed out above, rupture of the capacitor case must be avoided especially in large banks, since experience has shown that a ruptured case invariably damages adjacent units causing them to fail. Consequently, some other means for discriminating between the relatively low fault currents which occur upon failure of a capacitor unit in a single phase of a star-connected bank and normal currents including capacitor in-rush currents must be provided.

The failure of any capacitor unit in one phase of the star-connected bank will cause a potential difference between the neutral of the star-connected bank and the system neutral and, accordingly, I propose to provide a protective system which will operate on the potential difference between these two neutrals. The voltage zero point of the system may be obtained under all conditions by establishing an artificial neutral in a manner well understood by those skilled in the art, such as by connecting a Y-connected impedance device across the polyphase system in which the capacitor bank to be protected is included. The voltage of the system neutral will then appear at the artificial neutral established by the Y-connected impedance device.

In order to establish an artificial neutral, I have provided for each capacitor bank, such as 13 and 14, a three-phase transformer 18 having a Y-connected primary winding 19 with the neutral point thereof indicated at 20. The terminals of the primary winding are connected to the terminals of the associated star or Y-connected capacitor bank. A secondary winding 21 illustrated as an open delta winding is provided for each transformer 18. The neutral 17 of capacitor bank 13 and the neutral 20 of the associated impedance device are interconnected by a suitable conductor 22. Similarly, the neutral 17 of capacitor bank 14 and the neutral 20 of the associated impedance device are interconnected by a conductor 22. Upon the occurrence of a single-phase failure in capacitor bank 13 or 14, a potential difference will exist between the two neutrals 17 and 20 of the faulted bank, causing a zero-phase-sequence current to flow in conductor 22 and, consequently, also in the associated open-delta secondary winding 21.

In order to open the circuit-interrupting device 15 in response to such neutral voltage displacement, I have illustrated circuit-interrupting device 15 as of the latched closed type of circuit breaker having a trip coil 23 and an "a" switch 24 which is closed when the circuit breaker is closed and open when the circuit breaker is open. Trip coil 23 may be energized to initiate tripping of circuit breaker 15 in response to operation of either one of the relays 25 or 26. The relay 25 is energized in response to a fault in bank 13 by being connected in the open-delta winding 21 of the associated transformer 18, while the relay 26 is correspondingly energized in response to a fault in capacitor bank 14. Each of the relays 25 and 26 has normally open contacts 27 connected in parallel with one another in the trip circuit of circuit-interrupting device 15. In order to know whether relay 25 or relay 26 has caused operation of the circuit breaker 15, each of these relays is provided with a target 28 which is moved to the indicating position upon operation of the associated relay. Insofar as relays 25 and 26 are concerned, the operating potential thereof or pick-up voltage is not important since, under normal conditions, no neutral voltage displacement occurs and, consequently, no current flows in the relay windings. Whenever a fault in a single phase of the Y-connected capacitor bank 13 or 14 occurs, a definite difference of potential exists between the two neutrals 17 and 20 of the particular bank 13 or 14 containing a fault and the desired operation of one of the relays 25 or 26 will result. With the arrangement just described, operation of circuit breaker 15 can be accomplished within a relatively few cycles of the alternating current which is ample to prevent rupture of the case on this relatively low fault current level.

By breaking the capacitor into several banks controlled by a single device such as 15, the expense of separate circuit-interrupting devices for each unit is eliminated and, furthermore, by means of the targets 28, it is possible to determine the faulty bank and isolate it by means described hereinafter whereupon the unfaulted banks may be restored to service and, if a plurality of banks are used, the major portion of the power factor correction capacitance may be restored to service in a very short interval of time.

As was pointed out above, in the event of a substantially simultaneous failure in two phases of the star-connected bank, there will be a dead short circuit between two line conductors and, consequently, a very heavy fault current will flow, which if not interrupted in a fraction of a cycle, will cause considerable damage to not only the faulted capacitors but to adjacent ones in the unfaulted capacitor bank. The voltage displacement tripping scheme described heretofore does not operate fast enough to give the necessary protection and it has been discovered that current-limiting fuses of the type disclosed in United States Letters Patent 2,188,816, granted January 30, 1940 to W. K. Rankin and assigned to the same assignee as the present application are necessary for this high-speed circuit-interrupting operation. Accordingly, I have disclosed a current-limiting fuse 29 connected in series with each phase of each capacitor bank such as 13 and 14. Upon simultaneous failure of capacitors in two phases of a bank, the current-limiting fuse in one of the phase conductors will interrupt the current in a fraction of a cycle whereupon the remaining capacitors carry a fault current of relatively low level which is dependent upon the potential between the neutrals 17 and 20 which will cause operation of one of the relays 25 or 26 and, consequently, isolation of the banks by operation of circuit-interrupting device 15. Since the current-limiting fuses are usually mounted to operate also as a disconnecting switch, see, for example, United States Letters Patent 2,269,992, granted January 13, 1942, to Emil Scheurermeyer, the particular capacitor bank 13 or 14 which contains the faulted capacitors may be isolated through removal of the fuses 29 from their current-carrying positions and, consequently, the unfaulted Y-connected capacitor banks may be restored to service by reclosing circuit-interrupting device 15.

With the arrangement described heretofore, the advantages of a star-connected capacitor bank over a mesh-connected bank may be realized without the accompanying telephone interference encountered heretofore in systems requiring a grounded neutral for operation of the protective apparatus. With the above arrangement, complete protection of the capacitor banks is afforded with the neutral of the banks isolated at all times.

While I have shown and described a particular embodiment of my invention, I do not desire to be limited to the exact arrangement shown but seek to cover in the appended claims all those modifications which fall within the true spirit and scope of my invention.

What I claim as new and desire to secure by Letters Patent of the United States is:

1. In combination with a polyphase alternating-current circuit, a star-connected capacitor bank connected to said circuit, fault-responsive protective means responsive to the neutral voltage displacement of said bank for isolating said bank upon failure of an individual capacitor, and circuit-interrupting means connected between said circuit and said capacitor bank and responsive to a current of such a value as to be inoperative upon failure of a single capacitor in said bank but operative upon substantially simultaneous failure of capacitors in more than one phase of said bank to prevent damage to the other capacitors in said bank.

2. In a protective arrangement for a star-connected electric device having an isolated neutral and subject to relatively low fault currents on failure of one phase of the device but subject to very high fault currents on substantially simultaneous failure of two or more phases of the device, means for interrupting the supply of current to said device in response to the flow of an unbalanced relatively low fault current to said device, and other means responsive to the flow of a fault current to said device exceeding a predetermined relatively high value for interrupting the supply of current to said device in a shorter time than is required by said first-mentioned means.

3. In a protective arrangement for a Y-connected capacitor bank having an isolated neutral so that said capacitor bank is subject to relatively low fault currents on the failure of a capacitor in one phase of the bank but subject to very high fault currents on substantially simultaneous failure of capacitors in two or more phases of the bank, means responsive to the neutral voltage displacement of said capacitor bank for interrupting the supply of current to said bank, and other means responsive to the flow of a fault current to said bank exceeding a predetermined value for interrupting the supply of current to said bank in a shorter time than is required by said first-mentioned means.

4. In a protective arrangement for a Y-connected capacitor bank having an isolated neutral so that said capacitor bank is subject to relatively low fault currents on the failure of a capacitor in one phase of the bank but subject to very high fault currents on substantially simultaneous failure of capacitors in two or more phases of the bank, means responsive to the neutral voltage displacement of said capacitor bank for interrupting the supply of current to said bank, and current limiting fuses respectively connected in the circuits of a plurality of said capacitors and capable of operating in a shorter time than said first-mentioned means in response to the flow of a fault current to said bank in excess of a predetermined value.

5. In combination with a polyphase alternating-current circuit, a plurality of Y-connected capacitor banks associated with said circuit, each of said banks having an isolated neutral to eliminate difficulties with regard to communication interference, circuit-interrupting means for controlling the connection of said plurality of capacitor banks with said polyphase alternating-current circuit, each of said capacitor banks being subject to relatively low currents on the failure of a capacitor in one phase of the bank but subject to very high fault currents on substantially simultaneous failure of capacitors in two or more phases of the bank, means for effecting the operation of said circuit interrupting device in response to the flow of an unbalanced relatively low fault current in any of said capacitor banks and individual means for each capacitor bank responsive to the flow of a fault current to the associated capacitor bank in excess of a predetermined value for interrupting the supply of current to the associated bank in a shorter time than the time required to operate said circuit interrupting device.

6. In combination, a polyphase circuit, a plurality of electric devices arranged in star relationship to form a star-connected bank connected to said circuit and having an isolated neutral, a quick-acting circuit-interrupting means connected in series with each of said devices, each of said quick-acting circuit-interrupting means being responsive only to a current in its respective branch of said star-connected bank above a predetermined value which is in excess of the value of current flowing therein when only the device in one branch of the bank has failed, and means responsive to a predetermined unbalance of the voltage drops across said devices for isolating all of said devices from said circuit after a time interval longer than the operating time of said circuit interrupting means.

7. In combination, a polyphase circuit, a star-connected bank of capacitors connected to said circuit and having an isolated neutral, quick-acting current-limiting fuses respectively in series with the branches of said bank and responsive only to currents in excess of the values that flow through any capacitor when it alone is short circuited, and means responsive to a predetermined unbalance of the voltage drops across said capacitors for isolating all of said capacitor from said circuit after a time interval longer than the operating time of said circuit interrupting means.

FRANK M. STARR.